United States Patent [19]

Matalon et al.

[11] Patent Number: 5,240,498
[45] Date of Patent: Aug. 31, 1993

[54] CARBONACEOUS BINDER

[75] Inventors: Ralph Matalon, Cherry Hill, N.J.; Keith Bridger, Washington, D.C.; Francis W. Henry, Severna Park, Md.

[73] Assignee: Martin Marietta Magnesia Specialties Inc., Hunt Valley, Md.

[21] Appl. No.: 638,954

[22] Filed: Jan. 9, 1991

[51] Int. Cl.⁵ ................ B28B 7/34; C08L 5/00
[52] U.S. Cl. .................. 106/162; 106/38.23; 106/38.51; 106/38.6; 501/99; 501/100; 524/495; 524/594; 527/303
[58] Field of Search ............ 501/82, 90, 99, 100, 501/101; 264/63; 106/162, 38.23, 38.28, 38.3, 38.51, 38.6; 524/495, 594; 527/303; 424/484, 485

[56] References Cited

U.S. PATENT DOCUMENTS

| | | | |
|---|---|---|---|
| 2,938,807 | 5/1960 | Anderson | 106/44 |
| 3,007,805 | 11/1961 | Cline | 106/44 |
| 3,551,365 | 12/1970 | Matalon | 260/17.2 |
| 3,917,558 | 11/1975 | Gardikes | 260/38 |
| 4,020,027 | 4/1977 | Nicholas et al. | 106/38.51 |
| 4,022,739 | 5/1977 | Bove | 260/28.5 |
| 4,072,531 | 2/1978 | Funabiki et al. | 106/56 |
| 4,126,562 | 11/1978 | Goffinet et al. | 252/8.8 |
| 4,152,272 | 5/1979 | Young et al. | 252/8.8 |
| 4,162,984 | 7/1979 | DeBlock et al. | 252/8.8 |
| 4,265,963 | 5/1981 | Matalon | 428/288 |
| 4,387,173 | 6/1983 | Henry, Jr. et al. | 524/63 |
| 4,396,430 | 8/1983 | Matalon | 106/38.5 |
| 4,521,357 | 6/1985 | Kernion et al. | 264/63 |
| 5,002,908 | 3/1991 | Cassens, Jr. | 501/99 |

FOREIGN PATENT DOCUMENTS

| | | |
|---|---|---|
| 48-21353 | 6/1973 | Japan . |
| 0247370 | 2/1990 | Japan . |
| WO80/01768 | 9/1980 | PCT Int'l Appl. . |

Primary Examiner—Mark L. Bell
Assistant Examiner—Paul Marcantoni
Attorney, Agent, or Firm—Gay Chin; Bruce M. Winchell; Ronald J. Kubovcik

[57] ABSTRACT

Provided is a carbonaceous binder composition which comprises a polymerized and dehydrated carbohydrate, a monomer or polymer of resorcinol, and water. It is important that the carbohydrate is a polymer when combined with the remaining components of the composition. Polymerization of the carbohydrate prior to being combined with the other components of the composition has been found to result in an increased carbon yield upon pyrolysis of the binder. The binder composition also has an effective shelf life of three months or longer and gives off no objectionable smell either before or after being pyrolyzed. More importantly, the binder is also free of any skin or respiratory irritants, and is in effect non-carcinogenic.

25 Claims, No Drawings

CARBONACEOUS BINDER

BACKGROUND OF THE INVENTION

The present invention relates to a carbonaceous binder system. More particularly, the present invention relates to a binder useful in carbon containing refractories, and to refractory compositions useful in the formation of shaped or unshaped carbon-containing refractory articles. The present invention also relates to a process for preparing such a carbonaceous binder useful in carbon containing refractories.

Refractory products can be produced as unformed compositions, such as ramming, casting, or gunning mixes, or as preshaped objects, such as bricks. The standard rectangular brick, measuring 9 inches long, 4½ inches wide, and 2½ inches thick, is most often used to build straight walls. Tapered bricks which form self supporting arches, and tapered bricks with undercut slots on the exterior side from which the brick may be hung, may be used to form curved walls and roofs of a furnace. In addition to such bricks, special shaped articles have been designed such as corner blocks or edge blocks with curved interior faces, skew block, floor tile, muffle wall tile, and grid sections tile. Moreover, blocks of special shapes may be formed with various shapes and sizes of openings in the block for the insertion of burners and the like. Refractory shaped articles also include runners, gates, sleeves, nozzles, and troughs used to control the flow of molten material.

Bricks and other shaped refractory articles can be formed by hand molding, mechanical pressing, or casting in pre-shaped molds, either as water-based slurries or in molten form. Refractory bricks and other shaped articles have generally been formed from compositions containing refractory components and inorganic binders with or without a carbonizable binding material. The carbonaceous binder serves not only to bond the aggregates together during the manufacturing process, but when the articles (e.g., bricks, ladles, runners or patches) are heated in a steelmaking furnace, the binder decomposes and carbon is deposited within the pore structure of the article and around the refractory aggregate. This carbon residue, resulting from pyrolysis of the carbonizable binder at high temperature, forms a carbon bond between the refractory aggregates. The binder thus provides strength during manufacture and also resistance to slag and metal penetration and wear during use.

Coal tar pitch has previously been employed as such a binding material and continues to represent one of the most economical binding agents. Tars and pitches in general have found particular wide usage as binders for refractory aggregates in basic oxygen steelmaking furnaces, electric arc steelmaking furnaces, and iron and steel ladles. In U.S. Pat. No. 4,521,357 issued to Kernion et al, a combination of a thermosetting resin and pitch is used to even further improve the bond. However, in both bricks and shaped article applications, tar and pitch bonded refractory compositions have been recognized as generating substantial quantities of noxious fumes, including particulate matter and polynuclear aromatic hydrocarbons, during firing. These fumes pose air contamination and occupational health hazards and have been recognized as carcinogenic. Coal tar pitch also presents a hazard during installation resulting from skin contact, inhalation or ingestion.

Efforts have been made, and are continuing to be made, to replace the coal tar pitch binding materials in refractory compositions. For example, U.S. Pat. No. 4,072,531 issued to Funabiki et al. discloses a blast furnace taphole plugging composition including, inter alia, a lignin-modified phenolformaldehyde condensation product as a replacement for some or all of the tar binding material. In reference to prior art efforts to substitute conventional phenolic resins for the coal tar binder in similar compositions, Funabiki et al. note that conventional phenolic resins are disadvantageously expensive.

U.S. Pat. No. 4,022,739, issued to Bove discloses a binder for taphole plugging compositions which does not generate noxious fumes to the degree experienced with coal tar. The binder of Bove comprises a mixture of a high boiling hydrocarbon derivative and a synthetic resin, which may be a phenol-formaldehyde resin having resorcinol molecules in the polymer chain. In this regard, the use of resorcinol-formaldehyde and phenol-formaldehyde polymers as temporary binders for refractory materials including brick is well known. U.S. Pat. No. 3,007,805, issued to Cline and U.S. Pat. No. 2,938,807, issued to Andersen both disclose the use of phenol-formaldehyde and resorcinol-formaldehyde resins as carbonizable binders for refractory bodies.

Use of phenol-formaldehyde and resorcinolformaldehyde polymers as the binding material for refractory compositions, however, does not entirely solve the noxious fume problem. More specifically, these polymers commonly contain free formaldehyde. As noted in U.S. Pat. No. 3,917,558 issued to Gardikes et al., the formaldehyde vapors generated during curing are unpleasant, irritating, and pose a health hazard to persons continually exposed to such vapors. Moreover, these polymers may contain 5-10% free phenol, which may also vaporize during curing and thus generate toxic fumes. In addition, fumes from organic solvents employed with prior art synthetic resin binders are hazardous to manufacturing employees.

U.S. Pat. No. 4,387,173 issued to Henry, Jr. et al discloses compositions for forming carbon-containing refractories which overcome many of the noxious fume problems encountered with the use of coal tar binders and conventional phenol-formaldehyde resins as binders. The composition comprises a refractory filler, a binder for said filler and a hardening agent for said binder, with the binder comprising a mixture of polymers formed by the homopolymerization of resorcinol.

The use of sugars has also been suggested for use in refractories. For example, the use of a composite cross-linking agent/resin former composition as a resinous binder for foundry sands is disclosed in U.S. Pat. No. 3,551,365 issued to Matalon. The resinous binder composition comprises a reducing sugar, as well as water, a polyhydric phenol (e.g. resorcinol) and phosphoric acid. The composition can be generally prepared by dissolving the reducing sugar in water, then adding the polyhydric phenol and phosphoric acid. The system is then brought to a boil and maintained at about 115°–116° C. for a period of five to ten minutes. The resulting mixture can then be reacted with furfuryl alcohol or a furfuryl alcohol-formaldehyde resin to form the resinous binder. The high acidity of the binder, however, has been found to cause some problems For example, the shelf-life of the binder or binder/aggregate is found to be unacceptably short, only about 2 weeks. Whereas a shelf-life of at least 1 month, and preferably 3–6 months is desirable. Moreover, troublesome reactions can occur between the binder and the impurities found in SiC (silicon carbide) and/or fused bauxite found in many refractory aggregates. The odor of furfuryl alcohol also makes this binder undesirable for use in the steelmaking environment. Such difficulties can limit the effective range of use of such binders.

See also U.S. Pat. No. 4,396,430 issued to Matalon which discloses a composition useful as an adjuvant for silicate bonded sands. The adjuvant is obtained by reacting a reducing sugar, an optional dicarboxylic acid or acid anhydride and boric acid.

The use of a reducing sugar and phosphoric acid reaction product with a hardener is disclosed in U.S. Pat. No. 4,265,963 issued to Matalon. Therein, the resulting polymeric material is used as a coating for flameproof and fireproof products. This binder also has limited ability because of its high acidity.

Therefore, while the art of carbonaceous binder systems has proposed to overcome many of the problems inherent in working with the early toxic-and noxious binder systems for refractories, the replacement systems which are non-toxic and non-irritating have been found to typically yield lower carbon residues and have inferior properties after coking, among other problems. Improvements in these functional areas are needed to enhance the commercial validity of a non-irritating binder system.

Accordingly, it is an object of the present invention to provide a novel, improved carbonaceous binder having a wide range of effective refractory applications.

It is still another object of the present invention to provide such a carbonaceous binder which has a comparatively high carbon yield upon pyrolysis.

Yet another object of the present invention is to provide such a novel carbonaceous binder which exhibits excellent shelf-life.

Another object of the present invention is to provide a novel refractory composition comprised of a carbonaceous binder which is non-irritating, exhibits good shelf life, and provides a high carbon yield upon pyrolysis of the binder solids.

Still another object of the present invention is to provide a novel process for preparing such an improved non-irritating carbonaceous binder.

These and other objects of the present invention will become apparent upon a review of the following specification and the claims appended thereto.

SUMMARY OF THE INVENTION

In accordance with the foregoing objectives, there is provided by the present invention a carbonaceous binder composition which comprises a polymerized and dehydrated carbohydrate, a monomer or polymer of resorcinol, and water. The carbohydrate can be a monosaccharide such as the reducing sugars glucose or fructose, an oligosaccharide such as sucrose, a polysaccharide such as a starch, or any mixture of the foregoing. It is important, however, that the mono- and oligosaccharides are polymerized and dehydrated prior to being combined with the remaining components of the composition. The polysaccharides are already polymers and only require dehydration and/or blending to achieve a satisfactory state of solution or dispersion. In a preferred embodiment, an organic phosphate ester and/or carbon black is also included in the binder composition.

Also provided by the present invention is a refractory composition which comprises a refractory aggregate and a carbonaceous binder. The binder comprises a polymerized and dehydrated carbohydrate, a monomer or polymer of resorcinol, and water, wherein the carbohydrate has been polymerized and dehydrated prior to being combined with the remaining components of the binder.

A process for preparing the carbonaceous binder composition of the present invention where the carbohydrate is a sugar comprised of essentially mono- and oligosaccharides is also provided. The process comprises polymerizing and dehydrating the sugar, and then combining the polymerized and dehydrated sugar with water and a monomer or polymer of resorcinol.

A process for preparing the binder where the carbohydrate comprises polysaccharides (i.e., it is already polymerized) is also provided. The process comprises boiling the polysaccharide to dissolve it at a sufficiently high solids content (e.g., >50%). The polysaccharide is then combined with a monomer or polymer of resorcinol and water.

In a preferred embodiment, an organic phosphate ester and/or carbon black are also combined into the carbonaceous binder composition.

DETAILED DESCRIPTION OF THE PREFERRED EMBODIMENTS OF THE INVENTION

The present invention provides one with an improved carbonaceous binder which is useful in refractories. The binder composition has an effective shelf life of three months or longer and gives off no objectionable smell either before or after being pyrolyzed. More importantly, the binder is also free of any skin or respiratory irritants, and is in effect non-carcinogenic. Use of the binder composition in a refractory also gives a product of excellent strength, as the carbon residue of the binder composition after pyrolysis is greater than 20%, and in some cases even greater than 30% of the total binder content.

The basic carbonaceous binder composition of the present invention is comprised of a polymerized and dehydrated carbohydrate, a monomer or polymer of resorcinol, and water, with the carbohydrate having been polymerized and dehydrated prior to being combined with the remaining components of the composition. The carbohydrate provides the carbon in the binder composition, whereas the monomer or polymer of resorcinol combines with the carbohydrate to enhance the carbon yield and the density of the refractory product in which the binder is used. The water is present in the composition in order to control its viscosity. The binder composition should preferably be a homogeneous liquid with a viscosity in the range of from about 15000 cp at 25° C.

While the detailed description below will refer to sugars only, it should be understood that the present invention is applicable to carbohydrates in general, including the polysaccharides such as dextrin, gums and starches, provided that they can be treated to produce a satisfactory state of solution or dispersion.

The sugar employed can be any conventional sugar, such as a mono- or oligosaccharide (which includes disaccharides and higher) of the reducing or non-reducing type or a mixture of such monosaccharides and oligosaccharides such as found in corn syrup. The sugar is polymerized and dehydrated prior to being combined with the resorcinol and water components of the binder composition. This is important, for it has been found that an increased carbon yield is achieved upon pyrolysis of the binder. This carbon yield can be greater than 20%, and even 30%, of the total binder. The manner in which the sugar is polymerized and dehydrated can involve any conventional means, but for practical reasons it is preferred simply to cook or heat the sugar in order to drive off $H_2O$ (thereby dehydrating the sugar) and polymerize the sugar.

The form in which the sugar is cooked or heated can be any suitable form in which the sugar is available, with a sugar syrup or liquid being preferred for practical reasons. For example, one could simply boil a sugar syrup or liquid to increase the solids content to about 70-98 wt % solids by weight. It is most preferred that the dehydration is to about 80-98 wt % solids. The extent to which the sugar can be dehydrated and polymerized, of course, can vary greatly. The syrup or liquid used can be any commercially available syrup, for example, a high fructose corn syrup or high dextrose syrup, or syrups high in dextrose equivalents containing oligosaccharides.

Once the sugar has been polymerized and dehydrated, it is diluted to achieve the desired viscosity, if necessary, prior to being combined with the resorcinol component of the binder composition. The resorcinol component can comprise any monomer or polymer of resorcinol. Its presence enhances the carbon yield and density, and inhibits the recrystallization of the sugar at room temperature. The amount of resorcinol used can range up to about 20 wt % of the binder composition, preferably from about 1–20 wt %, and most preferably from about 10–20 wt %. Within this concentration range, the resorcinol or polymer thereof does not produce any irritating odor upon pyrolysis, nor does it pose any toxicity problems. Similarly, the amount of water used ranges from about 20 wt %, and most preferably from about 10 to about 20 wt %. The presence of water permits viscosity control and the development of plasticity in the dry fraction.

The binder composition can further comprise additional compositional components. Any of the conventional additives or components used in refractories can be added to the binder composition of the present invention.

Among the most preferred additional components are char formers, e.g., an acid forming organic phosphate ester and carbon black. Such additions can help to preserve the binder stability and the integrity of certain aggregates. Such additional components can be used separately or together, and are generally added to the composition when the polymerized and dehydrated sugar is combined with the resorcinol and water. The acid forming phosphate ester is most preferred where the ester is one that decomposes to form acid at a temperature below 200° C., and contains no free acid group. The amount of organic phosphate ester employed will generally range from about 0–20 wt %. The carbon black employed can be of any conventional variety, e.g., of the channel black, furnace black or lamp black variety. The amount of carbon black employed will generally range from about 0–8%. Both of the foregoing types of additional components are preferred in that their presence enhances the carbon residue yield and strength upon pyrolysis.

Maleic anhydride, phthalic anhydride and boric acid are among the other preferred additives. These additives enhance the polymerization of the sugar, and are therefore preferably added in small amounts, e.g., about 0.2 to about 3 wt %, to the sugar prior to or during dehydration and polymerization of the sugar.

The process for preparing the carbonaceous binder of the present invention therefore comprises first polymerizing and dehydrating a sugar, and then combining the polymerized and dehydrated sugar with a monomer or polymer of resorcinol and water, as well as any other optional components. The polymerization and dehydration is preferably accomplished by heating the sugar, which is most preferably in the form of a sugar syrup or liquid, until an increase in solids content in the range of from about 2–30 wt % is realized. The heating can be at any temperature sufficient to drive off water and result in a polymerization of the sugar. The length of time which the sugar is heated will correspond to the degree of polymerization desired. Generally, a sugar syrup can be heated in a temperature range of from about 230°–270° F. for a period of time ranging from about 30 minutes to 2 hours, and more preferably from about 45 minutes to about 1 hour.

The resulting carbonaceous binder can be used in other applications where pitch or phenolic resins have been used as binders. The carbonaceous binder can also be used in the manufacture of refractories, shaped (e.g., a brick) or otherwise (e.g., ramming mixes or gunnables). The carbonaceous binder can be used together with any conventional refractory aggregate as a binder therefor. The refractory aggregate can comprise fused alumina (brown or white), tabular alumina, bauxite, calcined diaspore, calcined bauxitic kaolin, calcined fireclay or mixtures thereof. The refractory mixture can further comprise silicon carbide, ball clay, graphite, silicon metal, as well as magnesite, magnesia, periclase, dolomite, chrome ore, and mixtures thereof.

One example of a typical refractory aggregate composition useful for trough rammables with which the binder composition of the subject invention can be used, and for which excellent results are obtained in terms of strength, refractoriness and penetration of slag, is the following:

| Composition Wt. % | Range | Preferred Range |
|---|---|---|
| Aggregate (1) | 60–85% | 65–75% |
| SiC (2) | 5–15% | 8–13% |
| Ball Clay, Air floated | 2–10% | 4–8% |
| Graphite (3) | 6–14% | 8–12% |
| Silicon Metal | 0–4% | 0–2% |
| Modifier and Fillers (4) | 0–4% | 0–2% |

(1) Can be selected from the group: Brown fused alumina, white fused alumina, tabular $Al_2O_3$, refractory grade calcined bauxite, calcined diaspore, calcined bauxitic kaolin. All about −4 mesh (4.75 mm).
(2) SiC may be −150 mesh #1 refractory grade material.
(3) Graphite can be "amorphous", or "flake" type.
(4) Modifiers can include antioxidants.

Other refractory aggregate compositions for use in rammables are well known and can also be used in combination with the carbonaceous binder of the present invention.

Another specific example of a refractory composition useful as a rammable refractory for troughs and iron making, is the following:

| Composition Wt. % | Range | Preferred Range |
|---|---|---|
| Aggregate (1) | 50–85% | 60–75% |
| SiC* | 5–25% | 12–18% |
| Ball Clay, Air floated | 2–8% | 4–6% |
| Graphite** | 2–10% | 5–8% |
| Silicon metal | 0–4% | 0–2% |

-continued

| Composition Wt. % | Range | Preferred Range |
|---|---|---|
| Modifiers and fillers (2) | 0-8% | 4-7% |

(1) Selected from the group consisting of: White fused aluminum oxide, brown fused aluminum oxide, tabular alumina, calcined refractory grade bauxite, all sized −4 mesh (4.75).
(2) Modifiers and fillers may be materials such as raw kyanites, antioxidants like elemental boron, glass forming glazes, boron carbide powder, ferro boron etc. and calcined alumina.
*SiC sizing should in general be about −150 mesh.
**Graphite should be −28 mesh and can be "amorphous", "flakes", "crystalline", or a combination of these. Artificial graphites tend to reduce workability to a great extent in this type of composition.

The foregoing example is as well merely illustrative and should not be construed as being limiting. Many other conventional refractory compositions can be used with the carbonaceous binder of the present invention.

The amount of binder to refractory or refractory aggregate employed can vary greatly. Generally, however, the amount of binder will range from about 1-15 wt %, more preferably from about 2-10 wt %, and most preferably about 3-8 wt % of the refractory aggregate.

The binder and aggregate can be mixed by any conventional mixing equipment known in the art, generally at ambient temperatures but, if necessary (e.g., when the binder viscosity is high), elevated temperatures may be employed.

Once the carbonaceous binder and refractory or refractory aggregate are combined, the resulting refractory composition can then be placed in a mold to form a shaped article, pressed, rammed or gunned. Pyrolysis of the binder then causes a bond to form between the binder and refractory, with the higher the carbon yield from the binder, the better the coked strength.

The use of the carbonaceous refractory binder of the present invention in making such refractories, whether a shaped article or unshaped refractory, has many advantages. The binder does not give off a bad odor at any time during the process, neither before pyrolysis nor after pyrolysis. The use of the binder is also essentially free of carcinogenic hazards. The binder contains no free formaldehyde or free phenol. The binder also contains no polynuclear aromatic hydrocarbons as in pitch. All of the foregoing compounds are known toxic or carcinogenic compounds, and are inherently a part of many prior art binders. Besides being essentially free of objectionable odors, toxic and carcinogenic compounds, the binder of the 15 present invention also exhibits an excellent shelf life, e.g., about 3 months or longer, and can provide a high carbon yield upon pyrolysis, e.g., 20% or higher. Thus, the binder is not only safe to use, but also provides one with a product exhibiting excellent physical characteristics.

In order to further illustrate the present invention and the advantages thereof, the following examples are provided. The examples are in no way meant to be limiting, but merely illustrative. The percentages in the following examples and throughout the application are by weight unless otherwise noted.

EXAMPLE 1

A binder composition comprised of 70% polymerized and dehydrated sugar, 15% resorcinol polymer and 15% water was pyrolyzed to 1000° C. (The polymerized and dehydrated sugar had been prepared by cooking dextrose syrup at a temperature in the range of from about 242°-266° F. for about 45 minutes.) The carbon yield was measured subsequent to the pyrolysis and determined to be 26.6%.

EXAMPLE 2

Five different binder compositions were prepared and used to prepare five rammable refractories (A-E), with the refractory aggregate (R/M) being the same for each. First, the dry raw materials were premixed in a Hobart Mixer for 1 minute; then the binder blend, generally 70% carbohydrate, 15% resorcinol or resorcinol polymer and 15% water was premixed with carbon black and phosphate ester (if used). This premix was added to the dry mixed aggregate. After this step was accomplished, it was desirable to add water as necessary to adjust the mix to rammable consistency. (It is also possible to pre-blend carbon black with the aggregate and the binder blends.) The properties of the five refractories were then compared with a conventional resin bonded refractory. The details of the compositions and their properties are given in Table 1 below.

TABLE I

|  | A | B | C | D | E | Conventional Resin Bonded Rammable |
|---|---|---|---|---|---|---|
| Composition, Wt. % |  |  |  |  |  |  |
| Brown Fused Alumina | 67 | 67 | 67 | 67 | 67 | 65.5 |
| Clay | 5 | 5 | 5 | 5 | 5 | 4.5 |
| Silicon Carbide | 15 | 15 | 15 | 15 | 15 | 17.0 |
| Silicon Metal | 2 | 2 | 2 | 2 | 2 | 2.0 |
| Graphite | 5 | 5 | 5 | 5 | 5 | 5.0 |
| Modifiers & Fillers | 6 | 6 | 6 | 6 | 6 | 6.0 |
| Added: |  |  |  |  |  |  |
| Invertose Syrup[1] |  |  |  |  |  |  |
| Blend A+ | 5.83 | — | — | — | — | — |
| Blend B++ | — | 5.8 | — | — | — | — |
| Dextrose Blend[2]++++ | — | — | 6.1 | — | 6.1 | — |
| Invertose Syrup[1] |  |  |  |  |  |  |
| Blend C+++ | — | — | — | 6.1 | — | — |
| Phosphate ester 80[3] | 0.38 | — | — | 0.2 | 0.4 | — |
| Phosphate ester 1139[3] | — | 0.37 | — | — | — | — |
| Carbon Black | 0.12[a] | 0.22[a] | 0.37[b] | 0.25[b] | 0.25[b] | — |
| Water, to adjust consistency | 1.3 | 1.78 | 2.1 | 1.8 | 1.7 | — |
| Resol Type Phenol-Formaldehyde Resin | — | — | — | — | — | 6.0 |
| Ethylene Glycol | — | — | — | — | — | 0.1 |
| Physical Properties |  |  |  |  |  |  |
| After drying at 300° F. (149° C.) |  |  |  |  |  |  |

TABLE I-continued

|  | A | B | C | D | E | Conventional Resin Bonded Rammable |
|---|---|---|---|---|---|---|
| Bulk Density, lb/ft³ | 177.8 | 180.8 | 173.1 | 172.6 | 173.0 | 175.2 |
| CMOR, psi | 1570 | 1430 | 1980 | 1140 | 1570 | 3860 |
| Open Porosity, % | 12.9 | 12.5 | 14.3 | 14.4 | 13.7 | 10.3 |
| Bulk Density by Open Porosity Method, lb/ft³ | 179.7 | 182.8 | 177.2 | 178.0 | 178.4 |  |
| After 3 hrs. × 1832° F. (1000° C.) Reducing Atmosphere |  |  |  |  |  |  |
| Bulk Density, lb/ft³ | 175.2 | 177.0 | 169.5 | 168.0 | 168.2 | 170.3 |
| Linear Change, % | −0.11 | 0.0 | −0.11 | −0.06 | −0.17 | +0.03 |
| CMOR, psi | 450 | 470 | 440 | 445 | 475 | 490 |
| Open Porosity, % | 18.4 | 17.2 | 19.4 | 19.9 | 19.3 | 18.0 |
| Bulk Density by Open Porosity Method. lb/ft³ | 175.4 | 178.5 | 173.1 | 175.6 | 177.7 |  |
| After 3 hrs × 2732° F. (1500° C.) Reducing Atmosphere |  |  |  |  |  |  |
| Bulk Density, lb/ft³ | 173.7 | 176.0 | 169.9 | 168.6 | 168.1 | 171.8 |
| Linear Change, % | +0.28 | +0.33 | +0.11 | +0.17 | +0.06 | +0.2 |
| CMOR, psi | 945 | 1300 | 1150 | 1170 | 1120 | 1200 |
| Open Porosity, % | 17.1 | 16.2 | 18.0 | 18.5 | 18.7 | 16.4 |
| Bulk Density, by Open Porosity Method, lb/ft³ | 175.9 | 178.4 | 173.7 | 178.6 | 176.8 |  |
| Rotary Slag Erosion Test Blast Furnace Type Slag % |  |  |  |  |  |  |
| Area Erosion (conventional pitch bonded composition exhibited 25.6% erosion) | 24.8 | 24.3 | 25.2 | 24.5 | 24.9 |  |

[1] Invertose syrup cooked from high fructose corn syrup @ 236-254° F. for −1 hr (13% weight loss).
[2] Dextrose with 0.5% added boric acid, cooked at 242-266° F. for about −45 min.
[3] Commercially available phosphate ester.
+70 parts invertose cooked syrup, 14.1 parts Penacolite RM 441 (resorcinol polymer available from Indspec Chemical Corporation, Pittsburgh, Pa.), 15.9 parts water
++70 parts invertose cooked syrup 16.5 parts Penacolite RM 441, 13.5 parts water
+++70 parts invertose cooked syrup, 15 parts Penacolite RM 441, 15 parts water
++++70 parts dextrose cooked syrup, 15 parts Penacolite RM 441, 15 parts water
Note: In the case of examples utilizing phosphate esters, the cooked sugar blends shown, carbon black and esters were pre-blended immediately prior to mixture and added as binder. The water was added thereafter to adjust for ramming bars. In the case of those models like C which did not contain esters, the carbon black and binder blend were pre-mixed prior to mixing in the aggregates. Water was then added to adjust for ramming bar samples.
[a] Channel black
[b] Furnace black The foregoing examples demonstrate the strength development profiles for the compositions of the present invention as being comparable with a conventional resin bonded composition, yet without any noxious odor.

EXAMPLE 3

A number of blends of dextrose syrup, which was polymerized in accordance with the present invention, were prepared. The blends were heated to 1200° C. in a reducing atmosphere with the volatiles and carbon and ash produced being measured, as reported in the Table below.

| Blend | Volatiles | Carbon+ and Ash | Remarks |
|---|---|---|---|
| A |  |  |  |
| 85% Dextrose Syrup 15% Water | 76.7 | 23.3 | Coked sample showed bloating & friable/weak texture. Material recrystallized during storage. |
| B |  |  |  |
| 80% Dextrose Syrup 5% Resorcinol 15% Water | 73.5 | 26.5 | Coked sample showed bloating with friable texture + some glassiness. Material recrystallized during storage. |
| C |  |  |  |
| 80% Dextrose Syrup 5% Resorcinol Polymer 15% Water | 73.0 | 27.0 | Same as B |
| D |  |  |  |
| 75% Dextrose Syrup 10% Resorcinol 15% Water | 72.8 | 27.2 | Less expansion than B or C, Glassy |
| E |  |  |  |
| 75% Dextrose Syrup 10% Resorcinol Polymer 15% Water | 73.7 | 26.3 | Less expansion than C, Glassy |
| F |  |  |  |
| 70% Dextrose Syrup 15% Resorcinol 15% Water | 71.6 | 28.4 | No expansion, Glassy |
| G |  |  |  |
| 70% Dextrose Syrup 15% Resorcinol Polymer 15% Water | 72.2 | 27.8 | Less expansion than E, Glassy |
| H |  |  |  |
| 65% Dextrose Syrup 20% Resorcinol 15% Water | 70.0 | 30.0 | No expansion, Glassy |
| I |  |  |  |
| 65% Dextrose Syrup 20% Resorcinol Polymer 15% Water | 69.8 | 30.2 | Less expansion than G, Glassy |

+After heating to 1200° C. in reducing atmosphere - No Hold at Temperature.

The foregoing results indicate an increase in the amount of carbon formed and an increase in the density, i.e., less expansion and more glassiness, when resorcinol is present in the composition. The sugar solutions also exhibit enhanced stability in the presence of resorcinol, as above 5% resorcinol recrystallization is inhibited.

While the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A non-irritating and noxious odor free carbonaceous binder composition for elevated temperature applications, containing no free formaldehyde, free phenol, or polynuclear aromatic hydrocarbons, consisting essentially of: about 55-95 wt % of a polymerized and dehydrated carbohydrate; about 1-20 wt % of a monomer or homopolymer of resorcinol; and about 1-20 wt % of water, wherein said carbohydrate is polymerized prior to being combined with the remaining components of the carbonaceous binder composition.

2. The carbonaceous binder composition of claim 1, further including a material selected from the group consisting of: an acid forming phosphate ester, carbon black, boric acid, malic or phthalic anhydride, and mixtures thereof.

3. A non-irritating and noxious odor free carbonaceous binder composition for elevated temperature applications, according to claim 1, consisting essentially of: about 55-95 wt % of a polymerized and dehydrated carbohydrate; about 1-20 wt % of a monomer of homopolymer of resorcinol containing no free formaldehyde, free phenol or polynuclear aromatic hydrocarbon; about 1-20 wt % of water; up to about 20 wt % of an organic phosphate ester; and, up to about 8 wt % of carbon black.

4. The carbonaceous binder composition of claim 1, wherein said carbohydrate is a sugar selected from the group consisting of: a mono-or oligosaccharide and mixtures thereof.

5. The carbonaceous binder composition of claim 4, wherein said sugar is a reducing sugar of the aldose or ketose type.

6. The carbonaceous binder composition of claim 5, wherein said reducing sugar is selected from the group consisting of: dextrose and fructose.

7. The carbonaceous binder composition of claim 4, wherein said sugar is a mixture of mono- and oligosaccharides selected from the group consisting of: corn syrup and cane juice molasses.

8. The carbonaceous binder composition of claim 1, wherein said carbohydrate is a polysaccharide.

9. The carbonaceous binder composition of claim 8, wherein said polysaccharide is canary dextrin.

10. A non-irritating and noxious odor free refractory composition for elevated temperature applications consisting essentially of: a refractory aggregate and a carbonaceous binder, said carbonaceous binder consisting essentially of: about 55-95 wt % of a polymerized and dehydrated carbohydrate; about 1-20 wt % of a monomer of homopolymer of resorcinol containing no free formaldehyde or phenol; and about 1-20 wt % of water, wherein the carbohydrate is polymerized prior to being combined with the remaining components of said carbonaceous binder.

11. The refractory composition of claim 10, wherein said carbonaceous binder further includes a material selected from the group consisting of: an acid forming phosphate ester, carbon black, boric acid, maleic or phthalic anhydride, and mixtures thereof.

12. A non-irritating and noxious odor free refractory composition of claim 10, wherein said carbonaceous binder consists essentially of: about 55-95 wt % of a polymerized and dehydrated carbohydrate; about 1-20 wt % of a monomer or homopolymer of resorcinol; about 1-20 wt % of water; up to about 20 wt % of an organic phosphate ester; and, up to about 8 wt % of carbon black.

13. The refractory composition of claim 10, wherein said refractory aggregate is selected from the group consisting of: brown fused alumina, white fused alumina, tabular alumina, bauxite, calcined diaspore, calcined bauxitic kaolin, sand, calcined fireclay, silicon carbide, ball clay, graphite, silicon metal and mixtures thereof.

14. A shaped refractory article comprised of the composition of claim 10.

15. The shaped refractory article of claim 14, wherein the article is a brick.

16. The shaped refractory article of claim 14, wherein the article is pyrolyzed.

17. A refractory furnace comprised of the composition of claim 10, which composition is pyrolyzed.

18. A shaped refractory article comprised of the composition of claim 12.

19. The shaped refractory article of claim 18, wherein the article is a brick.

20. The shaped refractory article of claim 18, wherein the article is pyrolyzed.

21. A refractory furnace comprised of the composition of claim 12, which composition is pyrolyzed.

22. A process for preparing a non-irritating and noxious odor free carbonaceous binder composition for elevated temperature applications comprising the steps of: polymerizing and dehydrating a sugar which is a mono- or oligosaccharide or mixture thereof by heating at a temperature in the range of about 230° to 270° F. for a period of time in the range of about 0.5 to 2 hours; and, combining about 55-95 wt % of polymerized and dehydrated sugar with about 1-20 wt % of a monomer or homopolymer of resorcinol and about 1-20 wt % of water, such that upon pyrolyzing the mixture at a temperature of about 1000° C. during use of the carbonaceous binder a carbon content of about 20 to 30% will be obtained.

23. The process of claim 22, wherein the sugar is polymerized and dehydrated by heating the sugar.

24. The process of claim 23, wherein the sugar heated is in the form of a sugar syrup or liquid.

25. The process of claim 23, wherein the sugar is heated until about 2-30 wt. % increase in solids is achieved.

* * * * *

UNITED STATES PATENT AND TRADEMARK OFFICE
CERTIFICATE OF CORRECTION

PATENT NO. : 5,240,498
DATED : August 31, 1993
INVENTOR(S) : Ralph Matalon et al.

It is certified that error appears in the above-identified patent and that said Letters Patent is hereby corrected as shown below:

Column 4, line 54, change "15000" to --1-5000--.

Column 5, line 36, change "20" to --1-20--.

Column 8, line 4, delete "15".

Column 9, Table 1, footnote 1, change "-1" to -- ~1--.

Column 9, Table 1, footnote 1, change "-45" to -- ~45--.

Column 11, claim 3, line 31, change "of" (second occurrence) to --or--.

Column 11, claim 10, line, 61, change "of" (first occurrence) to --or--.

Signed and Sealed this

Twenty-sixth Day of July, 1994

Attest:

BRUCE LEHMAN

Attesting Officer     Commissioner of Patents and Trademarks